EDGE CURL CONTROL FOR A FLAT VACUUM HEAD

Filed July 13, 1967 2 Sheets-Sheet 1

INVENTOR
SANDFORD PLATTER

United States Patent Office 3,533,058

Patented Oct. 6, 1970

3,533,058
EDGE CURL CONTROL FOR A FLAT VACUUM HEAD

Sandford Platter, Boulder, Colo., assignor to International Business Machines Corporation, Armonk, N.Y., a corporation of New York Filed July 13, 1967, Ser. No. 653,078
Int. Cl. G11b *15/60, 15/64*
U.S. Cl. 340—174.1 7 Claims

ABSTRACT OF THE DISCLOSURE

Edge curl prevention means in the form of longitudinally extending, shallow grooves within the surface of a nominally flat magnetic head assembly, said grooves terminating short of the head transducing elements, coupled to a source of partial vacuum pressure and positioned just inside the edges of the overlying moving magnetic tape.

SUMMARY OF THE INVENTION

Magnetic recording systems in recent years involve the high velocity movement of a flexible magnetic tape relative to a stationary multiple track magnetic read/write head assembly. In order to achieve maximum fidelity during either transducing function, attempts have been made to support the moving flexible magnetic tape on a frictionless air bearing with the moving tape spaced slightly from the surface of the head assembly. Some head assemblies have arcuate surface configurations with the flexible tape partially wrapped thereabout. Spacing between the tape and the head assembly is achieved by either hydrodynamic air bearings or the application of a positive fluid pressure. In such systems, the air-film thickness is dependent upon several parameters, including web tension, web velocity and the angle of wrap in relation to the bearing radius.

In an attempt to provide an air-film support system for moving flexible webs, in which the thickness of the air-film may be controlled with extreme precision, some systems employ a flat solid surface, over which the web of flexible material is moved at high speed. One or more transversely extending vacuum ports or slots are provided through the solid surface, in the vicinity of the leading and trailing edges, whereby, upon application of a controlled vacuum to the ports, the transverse slots act to break down the air-film lubrication which is created by the tape in passing over the leading edge of the flattened surface. During transport, the surface friction of the moving web tends to pump air between its surface and that of the flattened, solid supporting surface in the vicinity of the leading edge.

Such a system is described and claimed in United States application Ser. No. 463,727 to Barbeau et al., entitled "Vacuum Controlled Air Film," filed June 14, 1965, now Pat. No. 3,327,916. The multiple track magnetic read/write transducer means is positioned centrally of the rectangular flat head assembly. The flat solid surface includes leading and trailing edges spaced from the multitrack transducer and one or more transversely extending slots extend through the solid surface near the leading and trailing edges, the slots being coupled to a controlled source of vacuum whereby the flexible material is supported substantially parallel to the solid surface and at a controlled distance depending upon the velocity of the film and the amount of controlled vacuum pressure being applied to the transverse slots.

The recording systems, employing air-film lubrication, as outlined above, result in very small normal forces between the tape and the head which is quite advantageous in reducing wear. However, there is some tendency for the magnetic tape to curl about its edges, in a direction away from the supporting surface, especially in the vicinity of the transducer means.

In systems which employ a substantial wrap angle of the magnetic tape around the transducer, the longitudinal curvature of the tape may be, in itself, sufficient to prevent edge curl, since the curvature tends to impart lateral "stiffness" to the tape. Experience indicates, however, that with conventional magnetic tapes (i.e., tapes having flexible substrates, such as Mylar polyester of under about 2 to 3 mils thickness and magnetic coatings of about 500 microinches) the curvature necessary to prevent edge curl is only achieved when fairly large wrap angles are employed, or where extremely small wrap radii are present. For example, a wrap angle in the order of 20° around a radius of about 0.5 inch shows a tendency to reduce edge curl. Substantially greater wrap angles at 0.5 inch radius show greater control, as do wrap angles in the order of 10° to 20° about radii much smaller than 0.5 inch. Other factors, such as web tension and velocity, and the extent of edge damage to the tape also come into play to some extent. It has been found, however, that conventional recording tapes wrapped in the order of 10° about radii in the order of 0.5 inch behave, for edge curl purposes, substantially as though no wrap angle is employed. For all intents and purposes, head assemblies employing curvatures up to and including this amount may be considered as nominally flat.

The edge curl problem is a serious one in recording systems of the type described, since it causes substantial nonuniformities in tape-to-head spacing across the width of the tape and severely reduces fidelity of recording and playback with respect to the portions of the tape near the side edges.

It is, therefore, a primary object of this invention to provide an improved nominally flat vacuum read/write head assembly for use with a high speed, flexible magnetic tape in which edge curl is prevented in spite of the very small normal forces existing between the moving tape and the stationary head assembly.

It is a further object of this invention to provide an improved nominally flat vacuum read/write head assembly in which the edge curl prevention means does not adversely affect the head transducing operation and in which both edge curl prevention and air-film thickness may be selectively controlled.

It is a further object of this invention to provide simplified edge curl prevention means for a multi-track magnetic head assembly having curved or beveled leading and trailing control surfaces involving a total wrap angle in the order of about 10 degrees or less.

Other features of the invention will be pointed out in the following description and claims and illustrated in the accompanying drawings, which disclose, by way of example, the principle of the invention and the best mode which has been contemplated of applying that principle.

Figure 7:
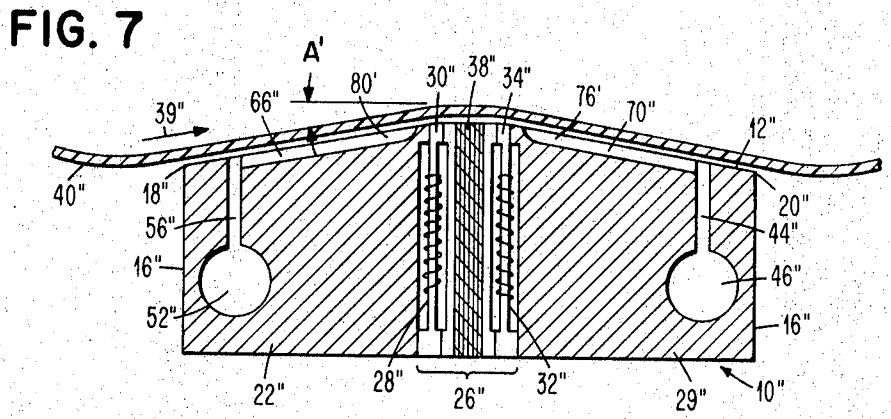

FIG. 7. is a side, sectional elevation of yet a third embodiment of the present invention in the form of a head assembly including beveled tape control surfaces on either side of the transducer means, involving a total wrap angle of less than 10 degrees and radii larger than 0.5 inch.

In general, the present invention is directed, in one form, to a gas film supporting system for supporting a moving web of flexible material relative to a flat, solid surface, including a leading edge. The solid surface includes at least one transverse slot near the leading edge, to which is applied a partial vacuum gas pressure for controlling the air-film thickness between the moving web and the flat, solid surface. Edge curl prevention is achieved by providing longitudinal, shallow grooves along the flat, solid surface, in a direction away from the leading edge, aligned with the edges of the flexible web, whereby the applied vacuum pressure in the vicinity of the web edges prevent edge curl.

The edge curl prevention means has application to a nominal flat read/write head assembly for use with a moving flexible magnetic tape. The multiple track transducer means are spaced from the leading edge of the flat, solid head surface, in the direction of tape movement and the shallow grooves terminate just short of the transversely extending multiple track transducer means. Further, transverse slots coupled to suitable controlled vacuum means may be positioned in the vicinity of the trailing edge of the flat head assembly and similar spaced longitudinally extending shallow grooves may be operatively coupled to a transverse slot for preventing edge curl of the magnetic tape subsequent to leaving the transducer area.

The edge curl prevention means of the present invention may be applied to head assemblies which have curved or beveled upper surfaces, opposite the moving tape, and which are beveled or curved to produce less than a 10 degree total wrap angle between the tape and the head assembly for a supporting surface of one-half inch radius or more. In either case, the longitudinal shallow grooves, to which the vacuum pressure is applied to prevent edge curl, terminate just short of the head transducer means. The shallow grooves may or may not be coupled to transverse vacuum slots acting in conjunction with the positive pressure created by the moving tape as it passes over the leading edge of the head assembly to provide controlled positioning of the tape with respect to the head assembly.

Figure 1:
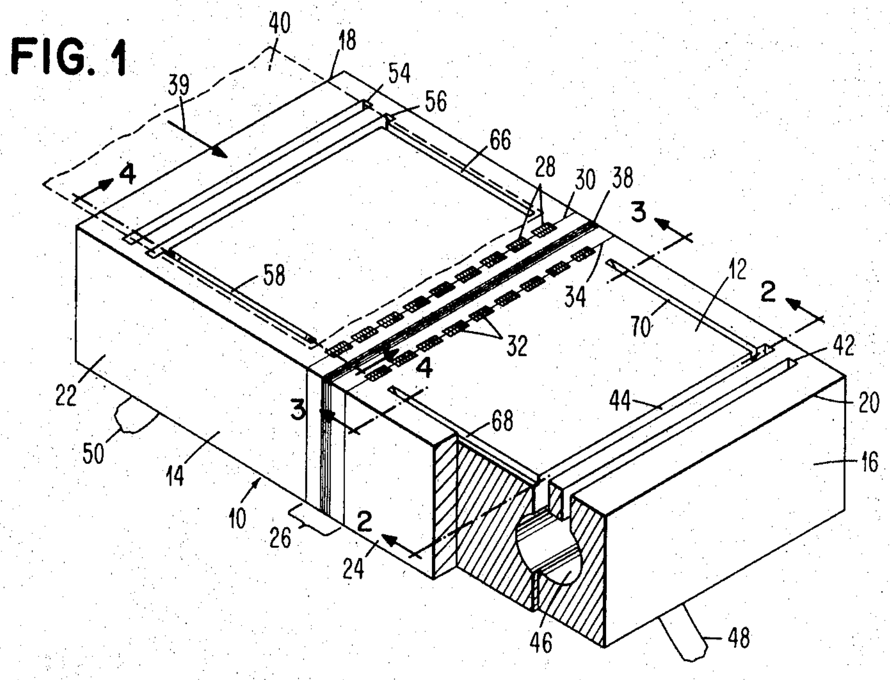
FIG. 1 is a perspective view, partially in section, of a flat vacuum tranducing head employing the edge curl prevention means of the present invention.

Turning to the drawings, FIG. 1 discloses a solid body read/write head assembly 10, including a flat upper surface 12, side walls 14 and end walls 16 forming a leading edge 18 and a trailing edge 20. The solid body magnetic head assembly 10 is rectangular in configuration. While the general structure of the magnetic head assembly 10 is unimportant to the present invention, with the exception that it be of a nominal flat vacuum type, it is conventional to employ a solid leading section 22 and a trailing section 24 separated by the magnetic transducer head section 26. The magnetic transducer section 26 includes a plurality of transversely spaced read head elements 28, one for each track, positioned within read gap 30. Head section 26 further includes a number of aligned, transversely spaced write head elements 32 positioned within write gap 34. A suitable spacer 38 of nonmagnetic material separates the write and read head elements of head section 26. The multiple track section 26 is positioned equidistant from both the leading edge 18 and the trailing edge 20. Arrow 39 indicates the direction of movement of the magnetic tape 40, indicated in dotted line fashion as spaced slightly above the head assembly.

As mentioned previously, the magnetic tape 40 is supported with respect to the surface 12 of the head assembly by an air-film thickness which is carefully controlled and in which a very small normal force occurs between the moving tape 40 and the stationary head 10. In this respect, in the vicinity of the trailing edge 20, there are provided first and second transversely extending vacuum slots 42 and 44, respectively. The slots 42 and 44, which are rectangular in section, and extend from the outer surface 12 of the head assembly, inwardly toward the center of head section 24. The slots 42 and 44 are connected in common by means of cylindrical chamber or vacuum 46 to a vacuum source (not shown) through tubular connecting means 48. Each slot 42 and 44 has a width that is sufficiently small so that the web or tape 40 cannot be injured under any operating conditions. Even if the magnetic tape is stopped, the application of the controlled vacuum through tube 48 is insufficient to damage the magnetic tape, even though it may be sucked into contact with surface 12. In like manner, in the embodiment shown, tubular means 50 fluid connects a source of vacuum (not shown) to the transversely extending cylindrical chamber or vacuum port 52. A second pair of transverse vacuum slots 54 and 56 are connected to the common vacuum port 52 but are spaced from each other and slightly from the leading edge 18 of head section 22.

As set forth in the previously identified application, if vacuum is applied to the slots 54 and 56 and the tape is moving at a given velocity in the direction of arrow 39, the moving tape acquires a pressure differential since its surface frictionally engages air molecules and tends to carry them along toward the stationary head assembly 10. After the tape passes the leading edge 18 of surface 12, the surface friction of the moving web pumps air between the surface 12 and the tape 40. This causes a rise in pressure underneath the tape in the vicinity of the leading edge 18. In order to effectively control the air-film thickness between the web and the surface 12 of the head, the controlled vacuum pressure, delivered by tubular members 48 and 50 to the respective vacuum ports 46 and 50, acts to reduce the rise in pressure beneath the tape. The tape feels the partial vacuum through the medium of the transverse grooves 42–44 and 54–56. Assuming that both vacuum ports 46 and 52 are subjected to a constant vacuum pressure and that the velocity of the tape 40 remains constant, there will be a tendency for the tape to be maintained spaced at a constant distance from the surface 12 of the head assembly.

Figure 4:
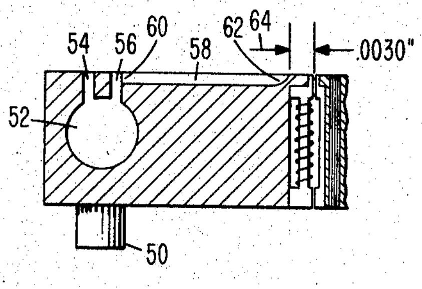
FIG. 4 is a side, sectional elevation of a portion of the apparatus shown in FIG. 1 taken about lines 4—4.

The present invention is directed to means for preventing the existence of any curl along the edges of the magnetic tape as the tape moves across the multiple track transducer means 28 and 32. With the transverse slots 42–44 and 54–56 being parallel to and adjacent the trailing and leading edges, respectively, of the assembly, there is a tendency for the sides of the magnetic tape to curl upwardly in concave fashion in the vicinity of the transducer means. This prevents the outer track transducer means from functioning properly. Edge curl is prevented by the employment of vacuum grooves which extend longitudinally of the head assembly, inwardly of the side walls 14 and parallel to the edges of the magnetic tape 40. For instance, shallow vacuum groove 58 extends from the innermost leading edge slot 56, away from the leading edge and toward transducer section 26 of the head assembly. The slot 58, as best seen in FIG. 4, has one end 60 coupled to the transverse vacuum slot 56, while the other end 62 terminates just short of the read gap 30. As indicated by arrows 64, the extreme inner end of the shallow groove 58 is spaced from the write gap containing the multiple track read element by a distance of .0030 inch. On the opposite side of the magnetic tape, there is provided a second longitudinally extending and parallel vacuum groove 66 of like dimensions and coupled at the end remote from the transducer area, to the same transverse vacuum slot 56.

On the opposite side of the transducer section 26, there are provided, in-line, longitudinally extending, shallow vacuum grooves 68 and 70 within the surface 12 of the head assembly. This produces the same anti-curl effect on the magnetic tape as it leaves the transducer area and passes toward the trailing edge 20 of the same head assembly. In this case, the shallow, longitudinally extending vacuum grooves 68 and 70 are coupled to respective ends of the transverse vacuum slot 44.

Figure 2:
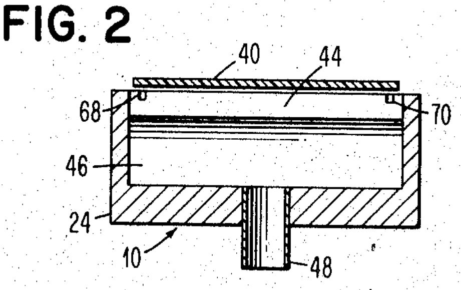
FIG. 2 is a sectional elevation of the apparatus shown in FIG. 1 taken about lines 2—2.
Figure 3:
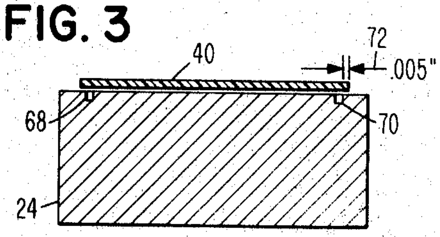
FIG. 3 is a sectional elevation of the apparatus shown in FIG. 1 taken about lines 3—3.

Reference to FIGS. 2 and 3 shows the position of the tape 40 with respect to the transverse vacuum slot 44 and the longitudinally extending vacuum grooves 68 and 70. It is noted in FIG. 3 that the width of the tape is slightly in excess of the transverse distance between slots 68 and 70 such that there is provided a slight overlap, in the case shown, as indicated by arrow 72, .005 inch to either side. It is noted in the edge curl prevention system of the present invention, that the vacuum pressure within the vacuum grooves varies inversely to its distance from its respective transverse slot. This is so because of the normal air-film distance between the tape and the flat surface 12 of the head assembly. In order to apply vacuum pressure in the vicinity of the transducer section 26, the applied vacuum pressure within the two transversely extending vacuum ports must pass through respective slots 44 and 56 and thence inwardly through the longitudinally extending vacuum grooves toward transducer section 26. A loss of vacuum is experienced such that very little vacuum pressure is present within the groove terminal ends, such as terminal end 62 of vacuum groove 58. The terminal ends of the vacuum grooves adjacent the magnetic read and write gaps are curved to prevent the buildup of debris, since the vacuum tends to move matter within the slot toward the transverse vacuum slots.

Figure 5:
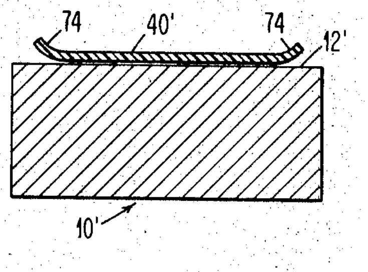
FIG. 5 is a sectional view of a prior art head assembly, in the vicinity of the transducing means, showing the effect of edge curl in the absence of the present invention.

The contrast between the application of the present invention insofar as the vacuum grooves are concerned to prevent edge curl may be visually observed by reference to FIGS. 3 and 5. In FIG. 3, the cross-section of the head assembly of FIG. 1, in the vicinity of the transducer means, shows the presence of the longitudinally extending vacuum grooves 68–70 as being just inside the outer edges of the tape 40 to prevent the tape from curling at its edges. Note the presence of curl in FIG. 5 in which a conventional flat, solid surface magnetic head assembly 10' in the vicinity of the transducer lacks the longitudinal vacuum grooves. In such a case, even though the assembly may use transverse vacuum slots in the vicinity of the leading and trailing edges to initially achieve the desired spacing of the magnetic tape relative to the head assembly, near the transducer area, the vacuum is not felt by the tape 40, and the outer edges 74 tend to curl away from the surface 12'. In the present invention, as evidenced in FIG. 3, a small negative pressure is created in the grooves because of airflow along the groove and into the vacuum slot associated therewith. This has the effect of holding the edge of the tape down to nominal separation, thus providing good transducing action for all tracks. For instance, in a typical magnetic head assembly, the small grooves would be at least .008 inch and usually less than .015 inch wide and at least .005 inch and usually less than .010 inch deep. The grooves run parallel to the direction of tape motion just on the outside edge of the outer track so that they are at least .005 inch in from the edge of the tape. In this embodiment, they extend from the last vacuum slot from the trailing and leading edges, respectively, to a point approximately .03 inch from its respective magnetic gap. The present invention may be applied to tape transport systems in which the tape moves into the head assembly area with a negative, positive or zero angle of approach, while the angle of exit may be independently any one of positive, zero or negative.

While the invention has particular application to a flat vacuum head assembly which employs the fluid pressure derived from the tape moving relative to the opposed flat surface of the head assembly, and the transverse vacuum slot for accurately controlling the distance therebetween, the invention has broader application to nominally flat head assemblies. Such head assemblies may include control surfaces in conjunction with the vacuum means for maintaining the moving tape at the prescribed distance from the surface of the head, or alternatively, the head assemblies may use capstan drive means or other tension applying devices to effect the desired spacing between the moving tape and the head assembly with a partial wrap of the tape about an arcuate or beveled head surface. Of course, in a tape transport system in which the transducer head assembly has a highly arcuate surface and in which there is a relatively large degree of tape wrap, the longitudinal curvature of the tape in and of itself prevents edge curl. However, where the total angle of wrap for a given head assembly is less than 10 degrees for a head radius of curvature on the order of ½ inch, or more, the angle of wrap is insufficient to prevent edge curl and it is necessary to provide positive means for achieving the same.

Figure 6:
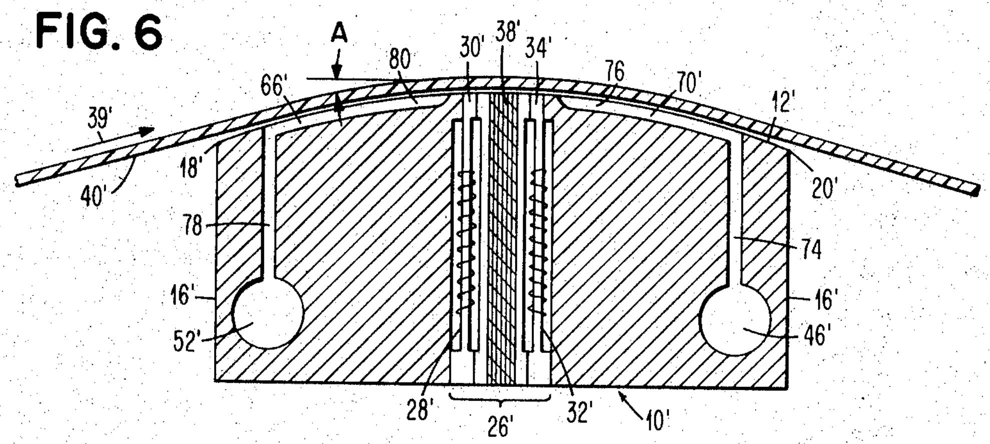
FIG. 6 is a sectional elevation of a second embodiment of the present invention in the form of a multitrack head assembly having an arcuate tape control surface involving a total wrap angle insufficient to create transverse stiffness that will prevent edge curl.

Referring to FIG. 6, there is shown a multiple track, read/write head assembly 10' having an upper arcuate surface 12' and end surfaces 16'. Assuming that the magnetic tape 40' is moving in the direction of arrow 39', it passes over leading edge 18' and leaves the assembly in the vicinity of the trailing edge 20'. In similar manner to the first embodiment, there is provided a transducer section 26' at the center of the assembly, in the form of laterally spaced read head elements 28 within read gap 30' and laterally spaced write elements 32' within write gap 34'. The read/write elements are longitudinally separated by spacer member 38'. The partial angle of wrap indicated by the arrows A is less than 5 degrees for the head assembly 10' having an arcuate upper surface 12' with a radius of curvature of ½ inch or less. Since both halves of the head assembly 10' have a curved surface 12' opposing that of the tape, the total angle of wrap is less than 10 degrees. Thus, in the absence of positive edge curl prevention means, the edges of the tape 40' would tend to curl in the vicinity of the transducer means 26'. It may be assumed in this case that means, such as capstans (not shown), achieve the proper positioning of the tape 40' with respect to the stationary head assembly 10' and produce the partial wrap of the tape about the curved arcuate head surface 12'. The embodiment of FIG. 6 is characterized by the absence of transverse vacuum slots. However, a cylindrical chamber or vacuum port 46, which is coupled to a vacuum source (not shown), extends transversely of the assembly to provide vacuum pressure in the longitudinally extending, spaced vacuum grooves. A vertical channel 74 acts to connect the vacuum port 46' to the vacuum grooves 70'. It is noted that, in like manner to the previous embodiment, the inner end 76 of each shallow groove 70' is curved so as to prevent the accumulation of debris or other matter which may be sucked into the vacuum groove 70' due to the vacuum pressure.

On the opposite side of the head assembly, there is also provided a transversely extending cylindrical chamber or vacuum port 52' which is fluid coupled to vacuum groove 66' through a vertical channel 78. The inner end 80 of the groove 66' which terminates just short of the transducer means 26' is also rounded to prevent the accumulation of debris.

The operation of the positive edge curl prevention means of this embodiment is the same as in the previous embodiment. Assuming that the tension of the moving web 40' defines the proper spacing of the tape 40' with respect to the arcuate surface 12' of the stationary head assembly, particularly in the area of the transducer means 26′, the decreasing vacuum effect within the longitudinally extending vacuum grooves in a direction toward the transducing means 26′ is sufficient to prevent edge curl without disrupting or interferring with the normal transducing function of section 26′.

Referring next to FIG. 7, there is shown yet a third embodiment of the invention as applied to a multitrack read/write head assembly 10″. The solid body assembly 10″ includes a flat, but reversely tapered or beveled upper control surface 12″, and end walls 16″. The surface 12″ is reversely inclined from the center of the spacer element 38″. Rather than coming to a sharp point, the surface 12″ in the vicinity of the transducer section 26″ may be rounded slightly. The end walls 16″ form a leading edge 18″ and a trailing edge 20″. In like manner to the embodiment of FIG. 1, the central magnetic transducer means or section 26″ separates the otherwise solid leading section 22″ and a trailing section 24″. Within the magnetic transducer section 26″, there are provided a plurality of transversely spaced read heat elements 28″ positioned within read gap 30″. Aligned, transversely spaced write head elements 32″ are positioned within write gap 34″. The spacer 38″ is formed of nonmagnetic material and separates the read and write head elements of head section 26″ in conventional fashion. The arrow 39″ indicates the direction of movement of magnetic tape 40″. As shown, the tape is spaced slightly in the manner of the FIG. 1 embodiment due to a self-induced air-film thickness.

The air bearing spacing is carefully controlled by the use of vacuum pressure in the same manner as in the first embodiment. In this respect, in the vicinity of the trailing edge 20″, there is provided a transversely extending vacuum slot 44″ which is connected to a cylindrical chamber or vacuum port 46″. Port 46″ extends transversely extending vacuum slot 44″ which is connected to a cylindrical chamber or vacuum port 46″. Port 46″ extends transversely of the assembly within trailing head section 24″. Means (not shown) provides vacuum pressure within the transversely extending port 46″. A second transverse vacuum slot 54″ is provided in the vicinity of the leading edge 18″ and is coupled to a vacuum source (not shown) through vacuum port 52″. In the same manner as outlined previously with respect to FIG. 1, in this embodiment, the movement of the tape 40″ in conjunction with the applied vacuum pressure within slots 44″ and 56″, causes the tape to be spaced slightly from the oppositely inclined sections of surface 12″ with the spacing being accurately and constantly controlled. Since, in like manner to the embodimet of FIG. 6, the partial wrap of the magnetic tape 40″ as it closely adheres to the control surface 12″ is less than 5 degrees and the total wrap about the transducer being less than 10 degrees, there would normally be a tendency for the edges of the moving tape 40″ to curl. This is especially so in the vicinity of the transducer section 26″ due to its remoteness from the transverse control slots 44″ and 56″. Again, longitudinally extending vacuum grooves 66″ and 70″ extend from their respective transverse vacuum slots 56″ and 44″ toward the transducer section 26″ but terminate just short of this section. The inner ends of the vacuum grooves are curved to prevent the accumulation of debris within the grooves. The vacuum pressure varies within the vacuum grooves inversely as the distance from the transverse vacuum slots increases. This provides a decreasing amount of edge curl prevention control as the web approaches the transducer section 26″. The operation of the moving tape relative to the head assembly 10″, the manner of maintaining the spacing between the moving tape and the head, and in fact, the achievement of edge curl prevention is identical with the embodiment of FIG. 1, the only exception being the partial wrap of the tape occurs about the head assembly since the head assembly is not truly flat but is only nominally flat due to the opposed bevel or taper of surface 12″ on both the leading and trailing sections 22″ and 24″, respectively. Of course, both in the embodiment of FIG. 6 and the embodiment of FIG. 7, the radius of curvature and the taper of the control surfaces has been somewhat exaggerated in the drawings to clearly show the invention.

While the invention has been particularly shown and described with reference to preferred embodiments, it will be understood by those skilled in the art that the foregoing and other changes in form and details may be made therein without departing from the spirit and scope of the invention.

What is claimed is:

1. In a nominally flat, solid surface magnetic head assembly including a transducer section and at least one control surface adjacent thereto for causing a moving magnetic tape to closely follow the control surface, but spaced slightly therefrom, and transverse slots carried by said control surface for closely controlling said spacing, the improvement comprising: longitudinally extending shallow grooves within said control surface, adjacent the edges of said flexible magnetic tape only, said shallow grooves extending inwardly from said transverse slots to points spaced slightly from said transducer section, and means for fluid coupling said shallow grooves and said transverse slots to a source of partial vacuum pressure for preventing edge curl in the vicinity of said transducer section.

2. The assembly as claimed in claim 1 wherein the terminal end of each shallow groove, in the vicinity of said transducer section, is curved so as to prevent accumulation of debris therein, in response to the application of the partial vacuum pressure.

3. The magnetic head assembly as claimed in claim 1 wherein said transducer section is centrally positioned within said head assembly and control surfaces extend outwardly on either side of said transducer section, said vacuum means comprises a plurality of longitudinally spaced, transverse slots in the vicinity of the leading and trailing edges of said assembly, carried by said control surface and said longitudinally extending shallow grooves, means for fluid coupling at one end, to the transverse slot most remote from the respective leading and trailing edges.

4. The assembly as claimed in claim 3 wherein the terminal end of each shallow groove in the vicinity of said transducer section, is curved to prevent the accumulation of debris therein, in response to the application of the partial vacuum pressure.

5. In a tape transport system including a magnetic head assembly having a transducer section and a solid surface adjacent thereto and means for moving a magnetic tape relative to said head assembly in close adherence to the opposed head assembly surface with less than a 10 degree total longitudinal wrap of said tape about said head assembly surface for a head assembly radius of curvature of one half inch or more, the improvement comprising: longitudinal shallow grooves within said surface extending to points spaced slightly from the transducer section and lying adjacent the edges of said flexible magnetic tape, and means for fluid coupling said shallow grooves to a source of partial vacuum pressure for preventing edge curl in the vicinity of said transducer section.

6. The tape transport system as claimed in claim 5 wherein said solid surface is longitudinally curved.

7. The tape transport system as claimed in claim 5 wherein said transducer section is centrally positioned between oppositely directed, beveled solid surfaces, each beveled surface including transverse slot means subjected to a partial vacuum pressure for precisely controlling the spacing between the moving magnetic tape and the transducer section, said shallow grooves extending inwardly from said transverse slot means to a point spaced slightly from said transducer means.

(References on following page)

References Cited

UNITED STATES PATENTS

| | | | |
|---|---|---|---|
| 3,151,796 | 10/1964 | Lipschutz | 179—100.2 |
| 3,418,434 | 12/1968 | Groenewegen | 179—100.2 |

OTHER REFERENCES

Magura, P.: "Channeled Magnetic Head," July 1961, IBM Tech. Disc. Bu., vol. 4, No. 2, p. 33.

BERNARD KONICK, Primary Examiner

W. F. WHITE, Assistant Examiner

U.S. Cl. X.R.

179—100.2; 346—74